United States Patent [19]
Liptoh et al.

[11] Patent Number: 4,792,850
[45] Date of Patent: Dec. 20, 1988

[54] METHOD AND SYSTEM EMPLOYING A PUSH-PULL LIQUID CRYSTAL MODULATOR

[75] Inventors: Lenny Liptoh, Greenbrae; Arthur Berman, San Jose; Lawrence D. Meyer, Mill Valley; James L. Fergason, Atheyton, all of Calif.

[73] Assignee: SteroGraphics Corporation, San Rafael, Calif.

[21] Appl. No.: 125,402

[22] Filed: Nov. 25, 1987

[51] Int. Cl.⁴ .............................................. H04N 13/04
[52] U.S. Cl. ...................................... 358/92; 350/132; 553/8; 358/88
[58] Field of Search ............... 358/88, 92, 3; 350/130, 350/132; 353/8

[56] References Cited

U.S. PATENT DOCUMENTS

| | | |
|---|---|---|
| 2,099,694 | 3/1934 | Land . |
| 2,417,446 | 8/1941 | Reynolds . |
| 3,256,776 | 6/1966 | Land ..................................... 358/3 |
| 3,858,001 | 12/1974 | Bonne . |
| 4,021,846 | 5/1977 | Roese . |
| 4,281,341 | 7/1981 | Byatt . |
| 4,385,806 | 5/1983 | Fergason . |
| 4,436,376 | 3/1984 | Fergason . |
| 4,523,226 | 6/1985 | Lipton et al. . |
| 4,540,243 | 9/1985 | Fergason . |
| 4,562,463 | 12/1985 | Lipton . |
| 4,582,396 | 4/1986 | Bos et al. . |
| 4,583,825 | 4/1986 | Buzak . |
| 4,698,668 | 10/1987 | Milgram ............................... 358/92 |
| 4,709,263 | 11/1987 | Brumage ............................. 358/88 |
| 4,719,482 | 1/1988 | Hora ..................................... 358/92 |
| 4,719,507 | 1/1988 | Bos ...................................... 358/88 |
| 4,736,246 | 4/1988 | Nishikawa ............................ 358/92 |

FOREIGN PATENT DOCUMENTS

3607629A1 10/1986 Fed. Rep. of Germany .
52-110516 3/1976 Japan .
53-80114 7/1978 Japan .
61-250613 11/1986 Japan .
2175171A 11/1986 United Kingdom .

OTHER PUBLICATIONS

"Compatible 3-D Television: The State of the Art" by Balasubramonian, et al.
"Three-Dimensional Projection with Circular Polarizers: " by V. Walworth, et al.
"Use of Strong Surface Alignment in Nematic Liquid Crystals for High Speed Light Modulation" by James L. Fergason.
"A Liquid-Crystal Video Stereoscope with High Extinction Ratios, A 28% Transmission State and One-Hundred-Microsecond Switching" by Thomas J. Haven.
"On the Merits of Bicircular Polarization for Stereo Color TV" by K. Balasubramonian et al.
Hartmann, et al., "Three-Dimension TV with Cordless FLC Spectacles," Information Display, Oct. 1987, pp. 15-17.

Primary Examiner—Howard W. Britton
Attorney, Agent, or Firm—Limbach, Limbach & Sutton

[57] ABSTRACT

A system and method employing a push-pull modulator for stereoscopic image selection. The modulator includes a pair of surface mode liquid crystal cells having orthogonal rub axes, and a linear polarizer having absorption axis bisecting the orthogonal rub axes, and has high speed, good transmission, and symmetrical dynamic range characteristics. A field-sequential stereoscopic video image may be transmitted from a video display screen (or video projector) through the modulator as the cells of the modulator are driven so that fields of alternately left-handed circularly polarized light and right-handed circularly polarized light will emerge. The transmitted circularly polarized light may be viewed using passive spectacles incorporating circular polarizing filters.

31 Claims, 5 Drawing Sheets

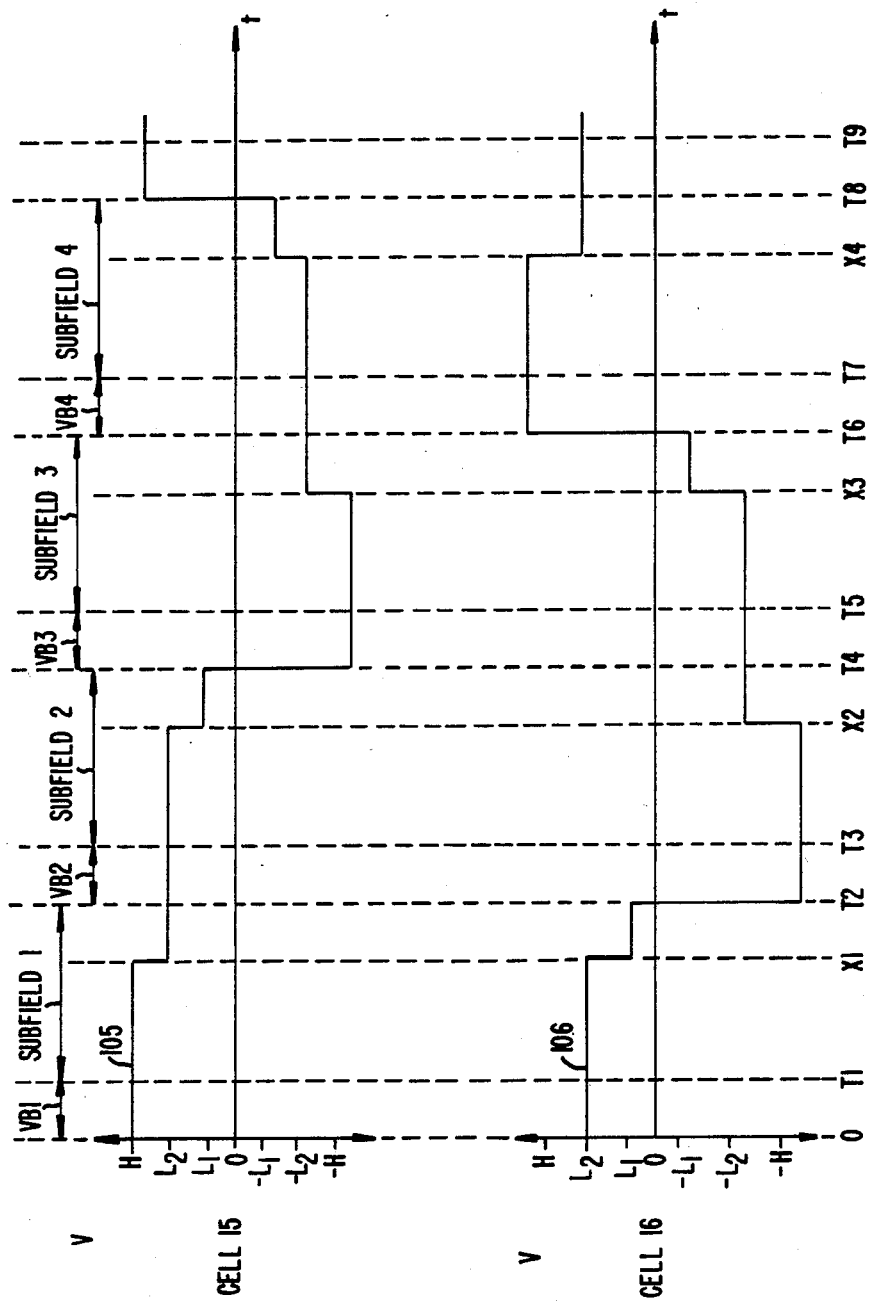
FIG._10.

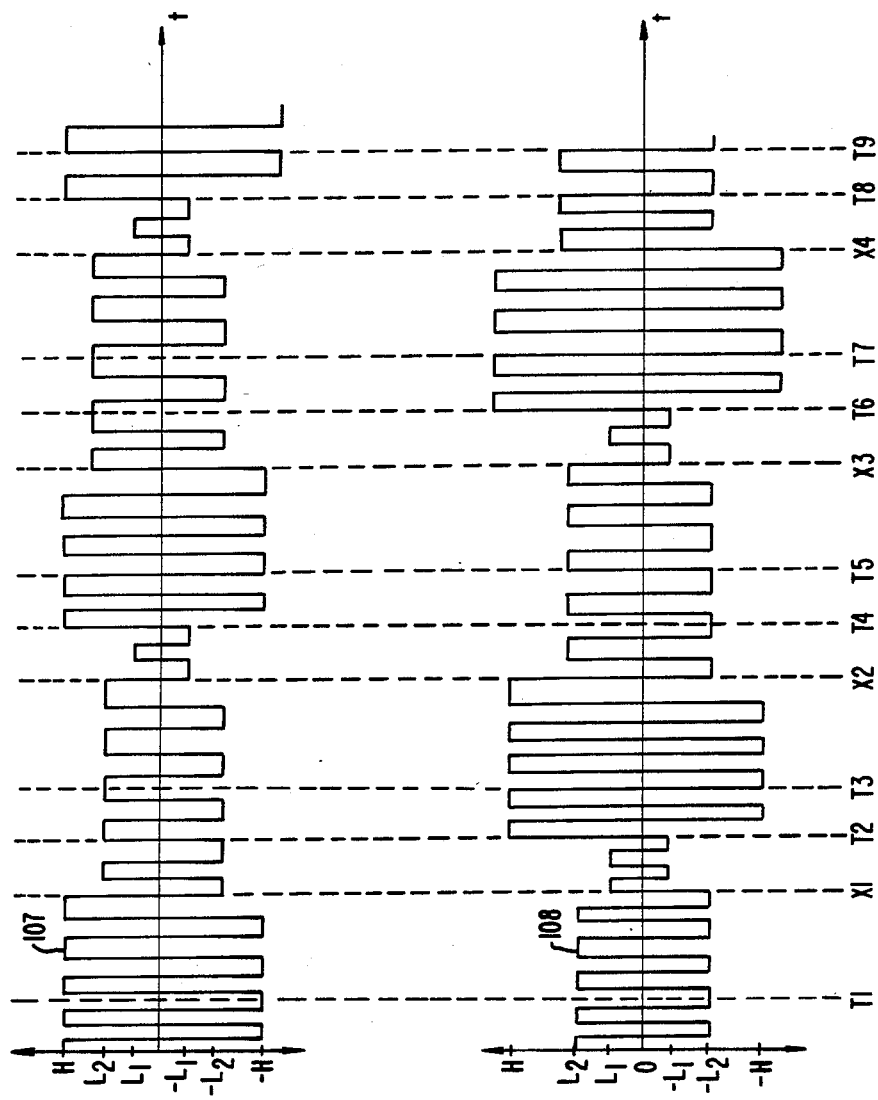
FIG._11.

METHOD AND SYSTEM EMPLOYING A PUSH-PULL LIQUID CRYSTAL MODULATOR

FIELD OF THE INVENTION

This invention relates generally to liquid crystal cell systems that may be electrically driven to transmit light having alternating circular polarization states. The invention relates more particularly to stereoscopic video display systems that include surface mode liquid crystal cells that are driven so as to transmit sequentially right-circularly polarized light and left-circularly polarized light comprising the fields of a field-sequential image.

BACKGROUND OF THE INVENTION

Stereoscopic video display systems that display a field-sequential image have been described in U.S. Pat. Nos. 4,523,226, issued June 11, 1985 to Lipton, and in 4,562,463, issued Dec. 31, 1985 to Lipton.

In one version of this type of display system (described in U.S. Pat. No. 4,562,463 with reference to FIGS. 1-3) an observer views a display screen through powered electro-optical shutters (elements 15 and 16 of U.S. Pat. No. 4,562,463) which are synchronized with the field-sequential image at the field rate. However, use of such active occluding shutters has a number of drawbacks. The active shutters must be synchronized with the field-sequential display by cable or wireless transmission means so the shutters will open and close at field rate. Since each shutter is open only half of the time, when viewing the environment surrounding the display, such as printed material, the ambient illumination is reduced by the duty cycle, i.e., by a factor of two. In addition, in the transmissive state, conventional active electro-optical shutters impose the attenuation of two sheet linear polarizers with parallel axes in front of each eye. If another video display is used, a disturbing "roll bar" will be seen, since the shutters may not be synchronized to the field rate of another display.

On the other hand, the use of what we call "onscreen modulation" systems has also been proposed. Such systems employ a large electro-optical polarization switching device, which covers the display screen and alters the polarization characteristic of the transmitted light at field rate, with passive selection devices including sheet polarizers that have no intrinsic duty cycle. In this type of onscreen modulation system, the brightness of the environment surrounding the display is reduced only by the attenuation of a single polarizing sheet. Moreover, there will be no "roll bar" artifact when looking at other, unsynchronized video displays.

U.S. Pat. Nos. 3,858,001, issued Dec. 31, 1974 to Bonne; 4,281,341, issued July 28, 1981 to Byatt; Japanese Patent Application (Kokai) No. 52-110516 by Fujita; and above-mentioned U.S. Pat. No. 4,562,463 (with reference to FIG. 4 thereof) have suggested the use of onscreen modulation techniques employing a large liquid crystal cell which alters the characteristic of polarized light at field rate, in which the observer views the display screen through passive eyeglasses with sheet linear polarizer filters. Together the modulator and sheet polarizers in the glasses form a shutter for image selection for a field sequential stereoscopic video display.

We can also find an early reference to a related concept by Reynolds, who, in U.S. Pat. No. 2,417,446, issued Mar. 19, 1947, suggests using a Kerr Cell for a variable retarder. In Reynolds' concept, a sheet linear polarizer is employed at the CRT (cathode ray tube) screen with active elements (Kerr Cells) and passive sheet linear polarizers at each eye.

Conventional video display systems employing onscreen modulation typically include a video screen covered by a sheet linear polarizer and an electrooptical variable halfwave retarder cell. Each observer wears linear polarizing spectacles to view light transmitted from the screen through the linear polarizer and halfwave retarder cell. The halfwave cell is typically liquid crystal (LC) cell that is switched from an isotropic state (at high potential) to a birefringent state (at low potential) at field rate. If the axis of the onscreen linear polarizer is at 45 degrees to the optical axis of the variable halfwave retarder, then the plane of polarized light exiting the retarder and visible to the observer will have its axis alternating between orthogonal states with each successive field. Hence, linear polarizers mounted with orthogonal axes for the left and right lenses in the spectacles alternately occlude or transmit the appropriate image.

Such conventional systems thus employ a liquid crystal suutter including first and second linear polarizers whose axes are orthogonal, with a liquid crystal cell interposed between the polarizers, and with the axis of the cell bisecting the polarizer axes. In the shutter's transmissive state, low voltage is applied to the cell, so that the cell is a uniaxial birefringent crystal which resolves the incident wave into two orthogonal component waves of linear polarized light, polarized parallel and perpendicular to the principal axis, respectively. The rate of propagation of light through the crystal is different for the two component waves. In passing through the halfwave retarder, the fast wave is retarded 180° less than the slow wave is retarded. The vector sum of the emerging fast and slow electric vectors results in a reflection about the principal axis of the initial polarization vector. If the initial polarization angle was 45 degrees, the reflection is equivalent to a rotation of the polarization angle by 90 degrees.

In the shutter's occluded state, characterized by high voltage, the electric vectors of an incoming wave are not rotated, and the liquid crystal cell is in an isotropic state. In this state, the index of refraction of the liquid crystal material is the same in every direction, and there is no retardation effect.

However, conventional onscreen modulation systems employing passive sheet linear polarizers to view transmitted light from a video screen have the following disadvantage. Because of the law of Malus (described, for example, in *Fundamental of Optics*, Fourth Edition, Jenkins and White, McGraw-Hill, 1976), head-tipping of only a few degrees by the viewer will lead to an unacceptable increase in image crosstalk. The law of Malus relates the intensity I of linear polarized light transmitted by a linear analyzer, to the intensity $I_o$ of the incident linear polarized light, and the angle b between the plane of the axis of incident polarized light and the plane of the axis of the analyzer, by the expression:

$$I = I_o \cos^2 b.$$

Thus, a small change in the angle b will result in a large change in transmission. Accordingly, only a little head tipping leads to the perception of the unwanted images by the eyes when viewing through linear polarizing spectacles.

In spite of the greatly improved environmental image brightness, the convenience, and the lighter weight of the passive spectacles compared with active shuttering goggles, for many applications it may be unacceptable to require that the viewer's head remain rather rigidly in place while observing the image.

If circular, rather than linear, polarized light could be employed, then polarizer extinction would not be angularly dependent, and head-tipping would not produce ghosting, as suggested by Land in U.S. Pat. No. 2,099,694, issued Nov. 23, 1937 (at page 2, left column, lines 62-68). In the case of circularly polarized light, the Law of Malus does not apply. Given a source of incident circularly polarized light of one handedness, and a circular polarizer analyzer of the opposite handedness, the transmitted intensity of light remains substantially constant with rotation of the analyzer with respect to the incident light. Accordingly, the unwanted field remains occluded from view.

However, conventional large liquid crystal cell (LLCC) devices are unsuitable for producing circular polarized light of the type suitable for use in a stereoscopic video display system.

For example, we believe that it is disadvantageous to employ a conventional LLCC in conjunction with a linear polarizer as described above, in combination with a conventional quarter-wave retarder as suggested in "Compatible 3-D Television: the State of the Art," by Balasubramonian, et al. in SPIE, Volume 402, 1983 (pp. 100-106). FIG. 1 illustrates this conventional approach. Video monitor 1 is fed a video signal from video source 5 via cable 6. CRT (or similar display screen) 2 is viewed by an observer through a linear polarizer 3, and LLCC half-wave retarder 4 (also referred to as LLCC 4). LLCC 4 is powered by controller 8 via cable 9. Controller 8 senses vertical synchronization pulses of video source 5 via cable 7 and uses these sync pulses to trigger LLCC 4, which varies optically from the isotropic to birefringent condition at video field rate. Quarter-wave retarder 13 is placed in front of LLLC 4. The absorption axis of polarizer 3 is oriented at 45 degrees to the rub axis of LLCC 4, and the fast optical axis of retarder 13 must be parallel to the rub axis of LLCC 4. Linear polarizer 3, LLCC 4, and quarter-wave retarder 13 are in intimate juxtaposition and mounted in front of CRT screen 2. Analyzing spectacles 10 with circular polarizing filters 11 and 12 are used for viewing the image. An example of a commercially available LLCC of the type that may be use in the FIG. 1 system is the "pi-cell" having 12 inch diagonal, manufactured by Tektronix, Inc. The disadvantages of the FIG. 1 arrangement will be discussed below.

In FIG. 2, we show a similar disadvantageous conventional approach for producing circular polarized light in a stereoscopic video display system. All elements of the FIG. 2 system are the same as those in FIG. 1, except that quarter-wave retarder 13 has been removed, and linear polarizer 3 has been replaced by conventional circular polarizer 14. The axis of the linear polarizer portion of circular polarizer 14 is oriented at 45 degrees to the rub axis of LLCC 4.

The observer views screen 2 through circular polarizer 14 and LLCC 4, which are in intimate juxtaposition and mounted at the screen, using glasses 10, which have circular polarizer analyzers of opposite handedness 11 and 12. Elements 1, 2, and 5 may be replaced by a suitable motion picture projector, and LLCC 4 driven at the appropriate motion picture field rate (determined by the projector speed and the length of each field segment on the film), in a conventional variation on the FIG. 2 system.

Circular polarizers commercially available from Polaroid Corporation (having product designation HN37CP), or similar circular polarizers, were used for projection of stereoscopic films in a few motion picture theaters in 1983. A motion picture projection system using such a circular polarizer is described in *Three-Dimensional Projection with Circular Polarizer*, by Walworth, et al., SPIE, Vol.462, Optics in Entertainment II (1984), pp.64-68.

The Polaroid circular polarizer consists of a sheet linear polarizer and a quarter-wave retarder bonded together with 45 degrees between their axes. In the FIG. 2 system, the sheet linear polarizer side of circular polarizer 14 faces CRT 2, and the quarter-wave retarder side faces LLCC 4. Light from the phosphor of CRT 2 passes through circular polarizer 14, and then through LLCC 4. The light output is circular polarized light, alternately left-handed and right-handed, as LLCC 4 is switched at the field rate.

Our experiments have shown that commercially available LLCC's, though available with diagonals of 12 inches or more, do not have adequate performance with respect to dynamic range and decay time (the time in which the shutter changes from its transmissive to its occluded state for a stereoscopic selection device application. The dynamic range of a shutter is defined as the ratio of its transmission in its on state to its transmission in its off state. For a 12 inch pi-cell manufactured by Tektronix used with the FIG. 1 and FIG. 2 systems described above, we have measured a dynamic range for one eye about fifty percent greater than for the other eye, that is 12:1 for one eye, and 8:1 for the other. Moreover, for either eye, the dynamic range of either of these conventional systems is unacceptably low. An equal dynamic range for each eye of many times the figures given above, is necessary for acceptable results. The result of the measured low add asymmetric dynamic range is an observed doubling or "ghosting" of the displayed image produced by either conventional system, because inadequate occlusion of the unwanted image leads to crosstalk.

In addition, althoug the present surface mode LLCC's (such as the Tektronix 12 inch diagonal pi-cell) have a fairly rapid rise time (the time in which the shutter changes from it occluded to its transmissive state), they have a slow decay time. The rise time and decay time are less than 1 millisecond and about 2 milliseconds, respectively. This asymmetry presents pooblems for a stereoscopic display since a portion of one set of fields (either the right or left) may show partial occlusion or discoloration as a result. The asymmetrical natures of the dynamic range and rise and decay times are closely related, and inherent in the construction of the conventional LLCC's. Since the vertical blanking interval of a raster scan video or computer graphics display is on the order of one millisecond, considerable improvement in speed is needed.

The asymmetrical nature of the dynamic range for the left and right eye arises from the fact that in the case of one eye, the analyzer (spectacle) axis must be perpendicular to the linear polarizer axis at the modulator, and the other eye must see through an analyzer with an axis oriented parallel with respect to the modulator polarizer linear axis. For the perpendicular case, the dynamic range is higher than for the parallel case.

In order for an on-screen switching device to produce an acceptable stereoscopic display, rise and decay time must be substantially the same and within the vertical blanking interval for a raster display. (Even faster rise and decay times are demanded by vector displays.) Moreover, the dynamic range must be substantially the same for both eyes, and the dynamic range must be many times greater than presently available from commercial LLCC's. Until the present invention, it was not known how to achieve these desired characteristics.

SUMMARY OF THE INVENTION

The invention includes an electro-optical modulator of the type disclosed as a communications device by Fergason in U.S. Pat. Nos. 4,540,243, issued Sept. 10, 1985, and in 4,436,376, issued Mar. 13, 1984. This modulator, which is known as a push-pull modulator, uses surface mode liquid crystal cells of a construction described by Fergason in U.S. Pat. No. 4,385,806, issued May 31, 1983. The construction of the push-pull modulator is as follows: Two surface mode liquid crystal cells whose rub axes are orthogonal are placed together in intimate juxtaposition with a linear polarizer whose absorption axis bisects the orthogonal rub axes of the two aforementioned cells. The order of the parts is as follows: linear polarizer, and the two liquid crystal cells.

In the inventive system, the cells are driven electrically out of phase (so that when one cell is in a high voltage state, the other is in a low voltage state, and vice versa). When driven appropriately and positioned in front of a cathode ray or similar display unit (with the linear polarizer nearest the screen), and when the driver of the push-pull modulator is synchronized with the field rate of the CRT display unit, the light transmitted from the display unit through the push-pull modulator will be left-handed circular polarized light, alternating with right-handed circular polarized light at the field rate. When viewed through spectacles including left and right handed circular polarizer analyzers, half of the fields of the field-sequential display will be transmitted to one eye and half to the other eye, thus providing an appropriate selection mechanism for a stereoscopic field-sequential video display.

BRIEF DESCRIPTION OF THE DRAWINGS

FIG. 10 is a pair of graphs (each with voltage on the vertical axis and time on the horizontal axis), showing a preferred embodiment of two driving signals for driving the two cells of the inventive push-pull modulator.

FIG. 11 is a pair of graphs showing an alternative version of the driving signals of FIG. 10.

DETAILED DESCRIPTION OF THE PREFERRED EMBODIMENTS

Figure 1:
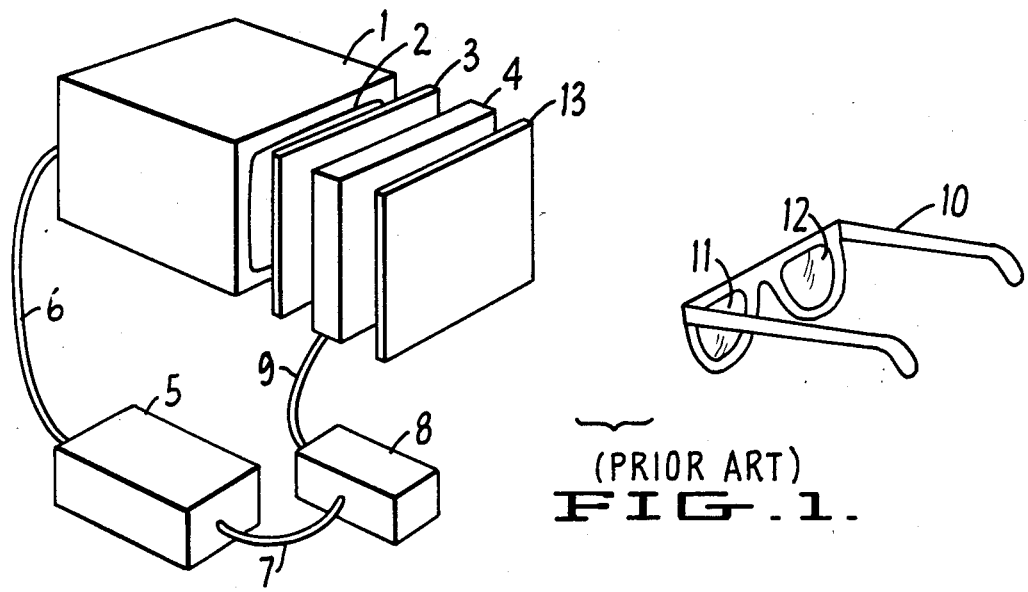
FIG. 1 is a schematic representation of a conventional system for producing circular polarized light in a field sequential stereoscopic video display.
Figure 2:
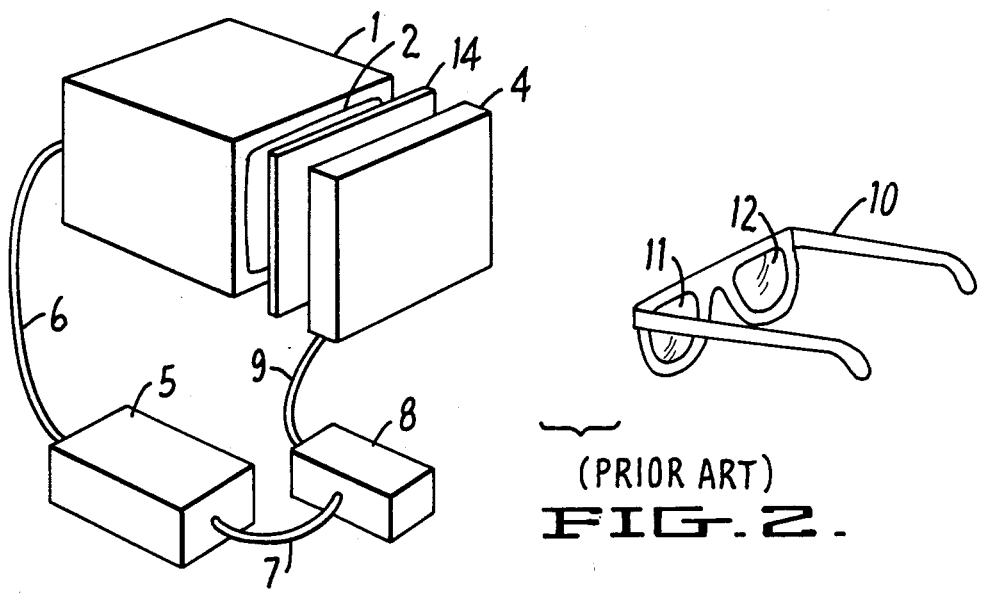
FIG. 2 is a schematic representation of an alternative conventional system for producing circular polarized light in a field sequential stereoscopic video display.
Figure 3:
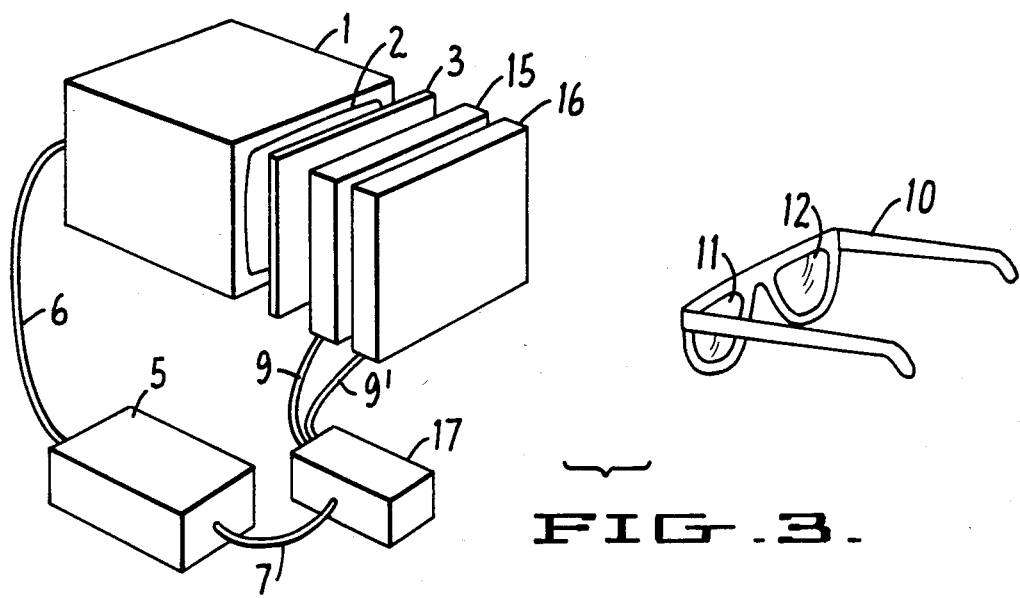
FIG. 3 is a schematic representation of a preferred embodiment of the disclosed invention in which a field-sequential stereoscopic video display has its light output modulated by a push-pull modulator that includes two surface mode LLCC's and a linear polarizer whose axis bisects the mutually orthogonal rub axes of the two sufface mode LLCC's.

FIG. 3 is a schematic representation of a preferred embodiment of the present invention. Video signal source 5 outputs a field-sequential stereoscopic image, such as that described in U.S. Pat. Nos. 4,523,226, or 4,562,463, to monitor 1, which may be a CRT unit or any kind of electronic video display. A push-pull modulator including linear polarizer 3 and liquid crystal cells 15 and 16 is placed in front of monitor 1's display screen 2. Liquid crystal cells 15 and 16 are of a construction first described by Fergason in U.S. Pat. No. 4,385,806. Cells 15 and 16 are surface mode liquid crystal cells which are fast acting, compared to the usual twisted nematic liquid crystal device. Cells 15 and 16 are driven by driver 17, which drives cells 15 and 16 electrically out of phase so that when cell 15 is at high potential, cell 16 is at low potential. Driver 17 is preferably of the type to be described below with reference to FIGS. 7–9. Alternatively, driver 17 may be of any commercially available type having the characteristics described below. Driver 17 is connected to cells 15 and 16 via cables 9 and 9'.

Driver 17 observes the sync pulses of the video signal output by source 5, and triggers the drive voltages to cells 15 and 16 in synchronization with the sync pulses so that the polarized light emerging from cells 15 and 16 will be in synchronization with the video fields produced by source 5. Conventional video signals include sync pulses of the type suitable for this purpose.

Figure 4:
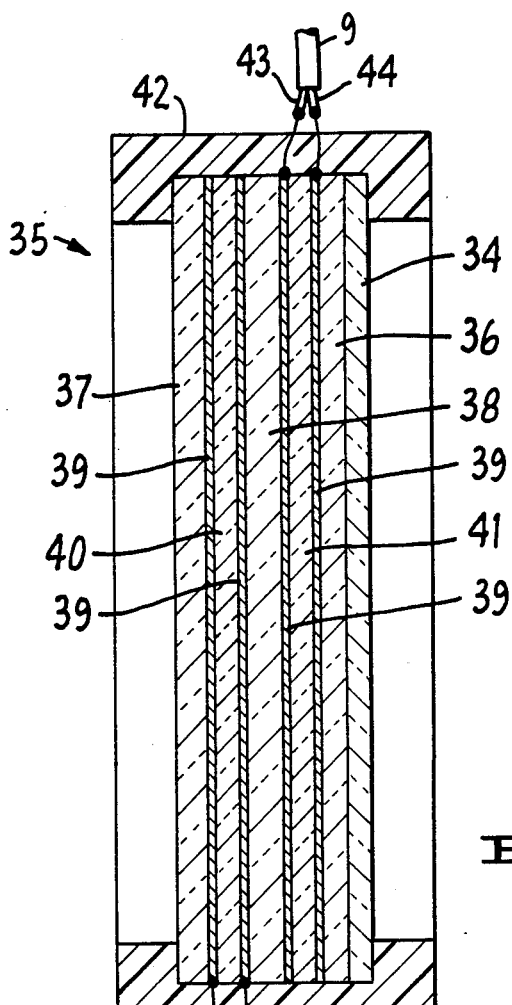
FIG. 4 is a cross-sectional view of a preferred embodiment of a push-pull liquid crystal modulator of the type used in the inventive system.

FIG. 4 is a preferred embodiment of a push-pull modulator (identified by reference numeral 35), to be positioned in front of screen 2 to serve the function of linear polarizer 3 of FIG. 3 and surface mode liquid crystal cells 15 and 16 of FIG. 3. Unit 35 includes linear polarizer 34, transparent plates 36, 37, and 38, and collar 42 for housing elements 36, 37, 38, and 43. Central plate 38 is coated by transparent electrical coating 39 on both of its surfaces. Plates 36 and 37 are each coated with a layer of transparent electrical coating 39 on their inner surfaces. Layers 40 and 41 of liquid crystal material are sandwiched between plates 36 and 38, and 37 and 38, respectively. Electrical conductors 43 and 44 of cable 9 provide electrical bias across iiquid crystal layer 41, and conductors 45 and 46 of cable 9' provide electrical bias across liquid crystal layer 40. An electrical driving signal may be applied across conductor pair 43,44 and across conductor pair 45,46, superimposed upon the electrical bias. On the inner surfaces of each coating 39 (which coating may be, for example, an alloy of tin oxide and indium oxide) is a coating whose surface molecules are aligned using an appropriate alignment technique, such as uniaxial rubbing of a polyvinyl alcohol coating or an angular evaporation technique. Plate 37, layer 40, the left half of plate 38, and the coating 39 sandwiched therebetween correspond collectively to cell 16 of FIG. 3. Plate 36, layer 41, the right half of plate 38, and the coating 39 therebetween correspond to cell 15 of FIG. 3. Collar 42 need not be included, where the other elements of the modulator are laminated together. In a variation on the FIG. 4 system, plate 38 may be replaced by two plates, each plate comprising part of a different liquid crystal cell of the push-pull modulator.

Figure 5:
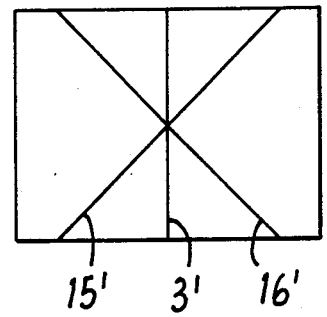
FIG. 5 is a schematic representation of the axes of the linear polarizer and LLCC's used in the construction of a push-pull modulator of the type included in the inventive system.

FIG. 5 shows the relationship of the various axes of linear polarizer 3 and liquid crystal cells 15 and 16. Line 3' represents the absorption axis of linear polarizer 3, and lines 15' and 16' represent the alignment, or slow, axes of cells 15 and 16. Axes 15' and 16' are orthogonal, and linear polarizer axis 3' makes a 45 degree angle with axis 15' and with axis 16'. In other words, axis 3' bisects the right angle made by axes 15' and 16'.

When cells 15 and 16 are driven electrically out of phase by driver 17, so that when one has a high voltage the other has a low voltage, given the configurations shown in FIGS. 3 and 5, circularly polarized light, alternately left-handed and right-handed, will be transmitted at the field rate. Driver 17 has its voltages set for the construction and materials of the particular cells used as elements 15 and 16. In one embodiment, driver 17 will output (through each of cables 9 and 9') an AC carrier wave (typically a 2 KHz carrier wave), modulated by a square wave. In a preferred embodiment (to be described below with reference to FIGS. 7-10), the driver will output carrier-less waves whose time-averaged voltage is substantially equal to zero. The signal transmitted through cable 9 (in both the embodiment employing an AC carrier wave and the embodiment employing a carrier-less wave) will be electrically out of phase with respect to the signal transiitted through cable 9'. Typically the peak-to-peak amplitude of the low voltage portion of the modulated AC driving signal will be between zero and ten volts, and the peak-to-peak amplitude of the high voltage portion will be a few tens of volts. Also typically, the square wave driving signal will include low voltage square wave portions (having peak-to-peak amplitude between zero and ten volts) alternating with high voltage square wave portions (having peak-to-peak amplitude equal to a few tens of volts).

When cell 15 is at low potential, cell 16 is at high potential, and vice versa. When one of the dual and coordinated drivers of unit 17 (driver unit 17 will sometimes be referred to as having a driver for each of cables 9 and 9') is switched from high to low voltage, the other driver voltage is switched from low to high. This switching takes place simultaneously, and ideally occurs within the vertical blanking interval of the video fields produced by source 5. Driver 17 includes means for sensing synchronizing pulses from the video source in order to control the two identical drivers which supply power through cables 9 and 9'.

The dynamic range of the push-pull modulator is optimized by looking through circular polarizing material (such as filters 11 and 12) at monitor 1's screen 2, when screen 2 is covered by the push-pull modulator comprising parts 3, 15, and 16. The voltages output by the drivers of unit 17 are adjusted until maximum dynamic range is attained. The point of maximum dynamic range may be determined visually, or by photometric means. The polarized light beam from linear polarizer 3 is transmitted through each of the two liquid crystal cells 15 and 16, each of which introduces its own independent phase shift into the light beam emerging from linear polarizer 3. The phase shifts vectorially combine so that the two liquid crystal cells 15 and 16 function with respect to the light beam in a manner analogous to the functioning of a push-pull amplifier acting upon an oscillatory electrical signal. As a consequence, the retardation of the resulting phase-shifted light is substantially greater than would be produced absent one of the cells.

Figure 7:
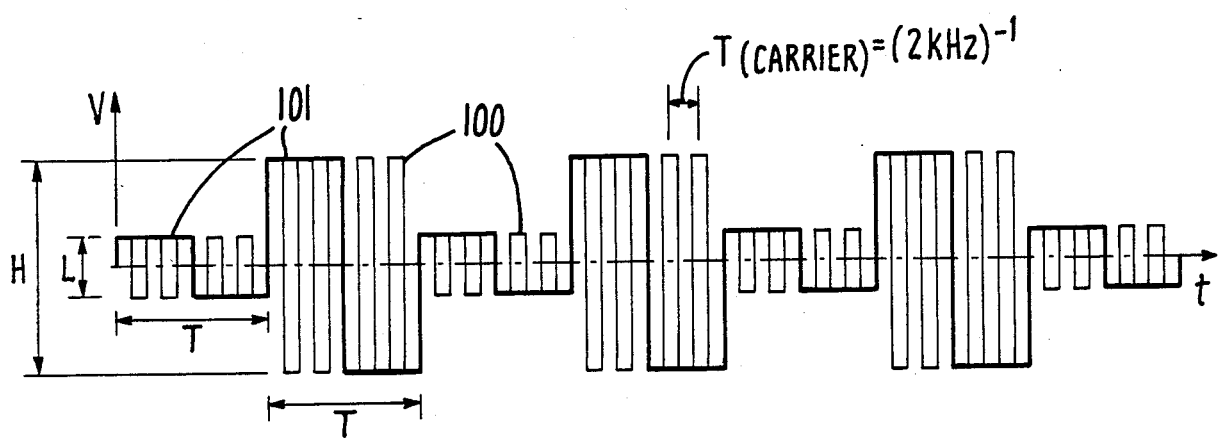
FIG. 7 is a graph with voltage on the vertical axis and time on the horizontal axis) of two driving signals, each of the type that may be used to drive one cell of the push-pull modulator of the inventive system.

In one embodiment, a driving signal having the waveform of signal 100 of FIG. 7 may be used to drive a modulator that includes a pair of cells each having thickness in the range 5 microns to 7 microns, and includes liquid crystal fluid from E. Merck, Part No. ZLI-1646. Signal 100 is a 2 kHz carrier wave modulated by square waves having period T. We achieve maximum dynamic range for the shutters used in our experiments, when the square wave modulating signal has lower peak-to-peak voltage L substantially equal to 6 volts for its lower voltage portions, and has higher peak-to-peak voltage H substantially equal to (or greater than) 40 volts for its higher voltage portions. For inventive shutters employing typical, commercially available components, the signals preferably will have lower peak-to-peak voltage in the range zero to 10 volts, and will preferably have higher peak-to-peak voltage in the range 40 to 80 volts. The liquid crystal cells employed will preferably have thickness in the range 5 microns to 7 microns.

It is conventional to employ a 2 KHz carrier for the driving signal for conventional surface mode liquid crystal cells. The purpose for using this frequency is to avoid electro-chemical reactions within the cells. The inner walls of the glass chambers of the cells immediately adjacent to the liquid crystal fluid are coated with a conductor. If the AC carrier wave is removed, some have argued that ion migration from one conductor wall to the other will take place, thereby rendering the cell inoperative.

Experiments we have performed demonstrate that cell performance is indeed greatly diminished if the cells are driven without using an AC carrier, but instead using a square wave which is either above or below ground. However, we have discovered that a carrier-less driving signal (such as one having the waveform of signal 101 of FIG. 7) which is equally above and below ground, with a net voltage of zero averaged over time, will produce no reduction in the cell's performance relative to the cell's performance when an AC carrier having frequency of order of magnitude several kHz is employed. Signal 101 is essentially the envelope of signal 100, and has period T, which will preferably be equal to the inverse field rate (i.e., $T = (\text{Field rate})^{-1}$).

When using a carrier-less driving signal such as signal 101, simpler, more compact, and less costly driver circuitry may be employed; and far less power is required to operate the cell. The reduction in power needed to drive the LLCC is truly substantial, often better than an order of magnitude. As a practical matter, large liquid crystal cells produced in a single manufacturing run have varying resistivities. Use of a carrier-less driving signal allows the full range of these cells to be driven, whereas some of these cells typically could not be driven using a modulated carrier wave driving signal. Further, use of a carrier-less driving signal allows an LLCC to be powered up into its functional mode more rapidly than is possible with a modulated carrier wave driving signal.

Figure 8:
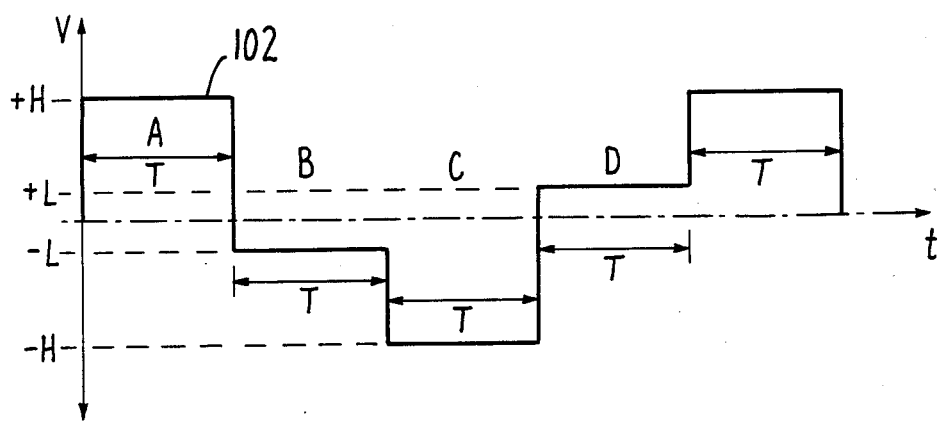
FIG. 8 is a graph (with voltage on the vertical axis and time on the horizontal axis) of another driving signal for driving one cell of the push-pull modulator of the inventive system.
Figure 9:
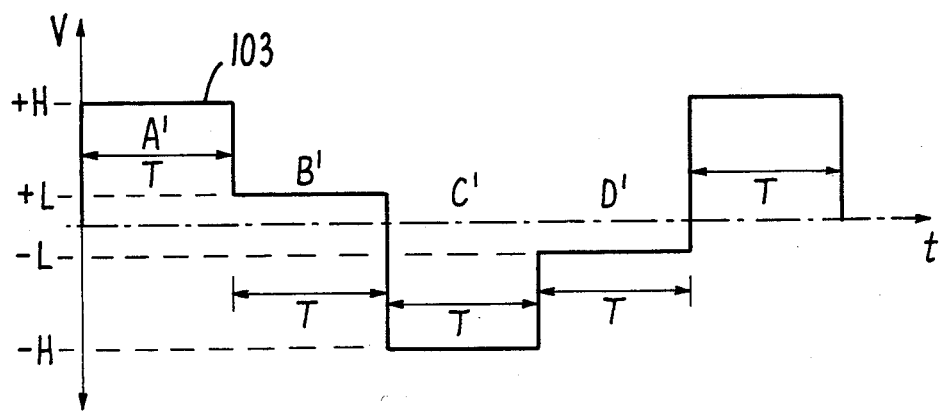
FIG. 9 is a graph (with voltage on the vertical axis and time on the horizontal axis) of yet another driving signal for driving one cell of the push-pull modulator of the inventive system.

Variations on carrier-less driving signal 101 (of FIG. 7) are shown in FIGS. 8, 9 and 10. Signal 102 of FIG. 8 includes four segments (A,B,C and D) of equal duration (T). Segment A has high voltage +H, segment B has low voltage −(L), segment C has high voltage −(H), and segment D has low voltage +L. Signal 103 of FIG. 9 also includes four segments (A', B', C', and D') of equal duration (T). Segment A' has voltage +H, segment B' has voltage +L, segment C' has voltage −(H), and segment D' has voltage −(L). The time-averaged voltage of each of signals 102 and 103 is thus equal to zero. It should be appreciated that the magnitude of voltage L may be eqaal to zero (i.e., +L=−(L)=zero volts), or substantially equal to zero.

It will be apparent to one of ordinary skill in the art of electrical drive circuit design how to construct a drive circuit, suitable for use in the inventive system, capable of producing a pair of driving signals having any of waveforms 100 through 103 (or numerous variations thereon), with one signal 180° out of phase with respect to the other.

We prefer to employ carrier-less driving signals having any of waveforms 101–103 (or variations thereon whose time-averaged voltage is substantially equal to zero) rather than a square-wave modulated AC carrier driving signal (having waveform such as 100) for the reasons set forth above. The preferred values of voltages +H and +L are in the ranges 40 volts$\leq$+H$\leq$80 volts, and zero volts $\leq$+L$\leq$10 volts.

We have found that it is preferable to use liquid crystal fluid having the lowest possible birefringence value, and to employ the thinnest practical surface mode liquid crystal cells in the inventive system. For example, when using 7 micron-thick cells, a much wider cone of view is obtained when the cells are filled with liquid crystal fluid having birefringence in the range 0.04-0.06 $\Delta n$ (such as Merck Catalog No. ZLI-2359 fluid having birefringence of 0.05 $\Delta n$, and available from Merck), than when the cells are filled with liquid crystal fluid having higher birefringence (such as Merck Catalog No. ZLI-1646 fluid having birefringence of 0.08 $\Delta n$). When driving such low birefringence cells, it is preferable to use drive signals of the carrier-less wave type (such as signals 101–103 of FIGS. 7-9) instead of drive signals having an AC carrier (such as signal 100 of FIG. 7). When 5 micron thick cells are employed, a better cone of view results than when 7 micron-thick cells are employed.

When employing carrier-less driving signals (such as signals 101–103 of FIG. 7-9) to drive low birefringence cells of a given thickness, the observed stereoscopic image will have reduced flicker, no matter whether viewed from a position on an axis through the center of the image, or from a position off such axis. In contrast, when using high birefringence cells of the same thickness, and driven by the same carrier-less driving signal, the observed stereoscopic image will have more noticeable flicker, though this flicker becomes less severe as the viewing position is moved closer to the axis though the center of the image.

When observing images using polarizing spectacles 10 as shown in FIG. 3 with circular polarizing analyzers 11 and 12, the linear component of these circular polarizing analyzers must have their axes orthogonal to axis 3' of linear polarizer 3 to obtain the maximum dynamic range. When observing an image emerging from unit 1 through the push-pull modulator using spectacles 10, an extremely high quality stereo image free of cross-talk or ghost images is seen, because of the high dynamic range and great speed of the shutter.

Our measurements indicate that for the modulator-selection system described with reference to FIG. 3, one can achieve a dynamic range of approximately 135:1 for each eye (measured steady state) and a rise and decay time of less than 0.2 milliseconds (more or less within the vertical blanking interval of typical raster video display units). In addition, the transmission achieved by the inventive system is excellent, approximately 30 percent during the transmissive state.

It will be apparent to one of ordinary skill in the art that the push-pull modulator assembly made up of polarizer 3, cells 15 and 16, could be combined with circular polarizer analyzers 11 and 12 in intimate juxtaposition to form an integral shutter unit. Such integrated shutter unit is a variation on the system described herein with reference to FIG. 3 where the analyzers (11 and 12) are physically separated from the modulator.

Figure 6:
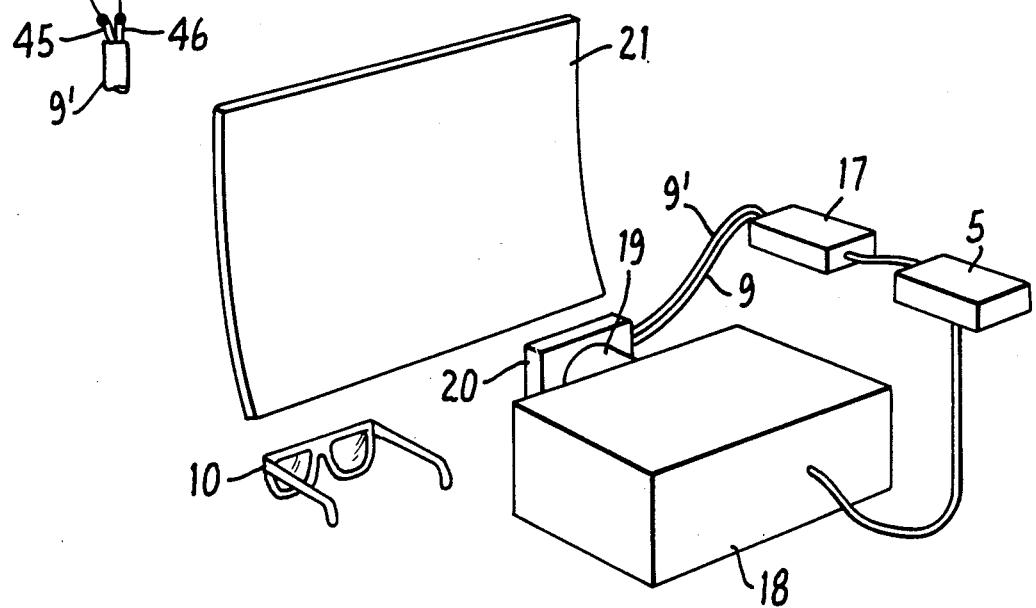
FIG. 6 is a schematic representation of another preferred embodiment of the invention, in which a field-sequential stereoscopic video projector has been outfitted with a push-pull modulator.

FIG. 6 shows a schematic layout for a video projector we have built, using an Electrohome Model ECP 2000 projector, in which push-pull modulator 20 is installed in front of the projection lens 19 of projector 18. The surface of reflecting screen 21 has an aluminum layer to conserve polarization. The projected image is observed with analyzing spectacles 10 of the same type as described with reference to the FIG. 3 embodiment.

Video source 5, driver unit 17, cables 9 and 9' and the push-pull modulator are of the same type, and serve the same function as in the FIG. 3 embodiment. The push-pull modulator outputs left an right-handed circularly polarized light alternately and in synchronization with the field rate of video source 5.

The ECP 2000 projector uses a single projection lens and three CRT's producing red, green and blue light respectively. It was found that the light emerging from the projector was partially polarized, resulting in variations in the projected color. The source of this unwanted polarization may have been the dichroic reflectors used within the projector's optical system. The result of this unwanted interaction between the projector light and the push-pull modulator was a red shading that grew in intensity from left to right across the screen. When a half wave plate was introduced as the rear element of the push-pull modulator, between the lens and polarizer, the red shading was entirely eliminated. The slow axis of the half wave plate was at 45 degrees to the axis of the polarizer, said polarizer's axis being oriented in the vertical direction.

The performance of the projection system of FIG. 6 was judged to be of extremely high quality, and a very satisfying stereoscopic image was observed.

FIG. 10 represents yet another preferred embodiment employing carrier-less driver signals. Signal 105 is employed to drive one liquid crystal cell of the inventive push-pull modulator while signal 106 is employed to drive the other liquid crystal cell of the push-pull modulator. The driving signals of the FIG. 10 embodiment (and the FIG. 11 variation to be discussed below) are capable of switching the liquid crystal cells faster than are the other driving signals discussed in this specification.

A brief explanation of the response of a liquid crystal cell to a driving voltage signal is helpful in understanding the advantages of the FIG. 10 and FIG. 11 embodiments. The "rise" time of a single liquid crystal cell is the time required, after the driving voltage has been switched from low to high, for the cell to switch from a half-wave retardation state to a "zero-lambda" or isotropic state. The decay time for such a cell is the time required, after the voltage has been switched from high to low, for the cell to switch from a "zero lambda" or isotropic retardation state to half-wave retardation state. The rise time (typically on the order of 0.5 ms.) is typically less the decay time (which is typically in the range 1.5–2.0 ms.).

The inventive embodiments discussed above employ two liquid crystal cells in a push-pull modulator arrangement in order to achieve much faster switching times, for most liquid crystal materials, than can be achieved using single liquid crystal cells. However, we have found that since the decay time for a liquid crystal cell unit depends on the birefringence ($\Delta n$) of the liquid crystal material used therein, when using liquid crystal material of very low birefringence the decay time associated with the inventive embodiment discussed above may become unacceptably long.

The driving scheme of FIG. 10 solves this problem by substantially simultaneously switching the cells of the push-pull modulator "off" before the end of each video subfield. If the alignment axes of the cells are orthogonal, the net retardation produced by the two cells of the modulator will not significantly change while the cells are simultaneously relaxing ("decaying") to a lower voltage state. With reference to FIG. 10, vertical blanking intervals occur during the periods 0 to T1, T2 to T3, T4 to T5, and T6 to T7. The subfield occurring between 0 to T2 and the subfield occurring between T2 to T4 together comprise a field of a standard color television signal. The upper graph of FIG. 10 shows the waveform for driving one cell (i.e., cell 15 of the FIG. 3 embodiment), and the lower graph of FIG. 10 shows the waveform for driving the other cell (i.e., cell 16 of the FIG. 3 embodiment).

If the cells have orthogonally oriented alignment axes, driving voltages $H_1$, $L_2$, and $L_1$ may be chosen to produce retardation values as shown in the following table:

| Cell No. | Voltage | Retardation Value |
|---|---|---|
| 15 | H or −(H) | 0λ |
| 15 | $L_1$ or −($L_1$) | ½λ |
| 15 | $L_2$ or −($L_2$) | ½λ |
| 16 | H or −(H) | 0λ |
| 16 | $L_1$ or −($L_1$) | −½λ |
| 16 | $L_2$ or −($L_2$) | −½λ |

Thus, when both of the cells are switched to a lower voltage state at substantially the same time X1, the net retardation produced by both cells is unchanged (the net retardation is equal to −(½λ) immediately before and immediately after time X1). For this reason, the slow "turn off" switches from higher voltage states to lower voltage states occurring at times X1, X2, X3, and X4 outside the vertical blanking intervals are not visible to an observer. The only switches occurring at the start of each vertical blanking interval are fast "turn on" switches, which are sufficiently fast to be completed during the vertical blanking intervals. For example, although cell 15 is switched to a higher voltage state at T4 (thus changing the net retardation the cell pair from ½λ to −(½λ)), this switch occurs during the vertical blanking interval from T4 to T5 and hence is not visible to an observer. At times X1, X2, X3, and X4 the absolute magnitudes of the driving voltage signals substantially simultaneously decrease. Increases in the absolute magnitude of the voltage signals (such as at T2 and T4) do not occur substantially simultaneously. As for the FIG. 8 and FIG. 9 driving signals discussed above, the time-averaged voltage of each of carrier-less signals 105 and 106 is substantially equal to zero.

FIG. 11 is a variation on the FIG. 10 scheme, which employs modulated carrier waves 107 and 188, rather than carrier-less waves 105 and 106, as the driving signals for the cells. The FIG. 11 driving scheme will have substantially the same switching time characteristics as the FIG. 10 scheme. As in FIG. 10, the absolute magnitudes of signals 107 and 108 (or strictly speaking, the absolute magnitudes of the envelopes of signals 107 and 108) substantially simultaneously decrease at times X1, X2, X3, and X4.

It should be appreciated that in any of the inventive embodiments, the driving signals supplied to the push-pull modulator via cables 9 and 9' need not be AC signals (such as signal 100 of FIG. 7) modulated by a square wave having frequency equal to the field rate of the signal emerging from source 5. Instead, as explained above, the driving signals may be carrier-less signals such as signals 101–103 of FIGS. 7–9 or signals 105 and 106 of FIG. 10. In the FIG. 7–9 embodiments, the carrier-less signals (one 180 degrees out of phase with respect to the other) should have frequency equal to the field rate. The driving signals need not have waveform identical to that of any of those shown in FIGS. 7–11, however. Rather, they may have any of a variety of waveforms, provided that they transmit circularly polarized light of alternating handedness with frequency corresponding with the field rate.

The described method of operating the inventive system considered to comprise a part of the invention in its broadest scope. The foregoing description is merely illustrative of the invention. Various changes in the details of the methods and apparatus described may be within the scope of the appended claims.

What is claimed is:

1. A push-pull liquid crystal modulator system, for transmitting circularly polarized light of alternating handedness, including:
   (a) a pair of surface mode liquid crystal cells having orthogonal rub axes;
   (b) a linear polarizer having an absorption axis bisecting the orthogonal rub axes; and;
   (c) a driver electrically coupled to the cells, and capable of driving the cells so that when one cell in the pair is in a higher voltage state, the other cell in the pair is in a lower voltage state.

2. The system claim 1, wherein the drive is capable of driving a first one of the cells with a carrier-less first signal, having time average voltage substantially equal to zero, that alternates between a low voltage portion and a high voltage portion, and the driver is capable of driving a second one of the cells with a carrier-less second signal having substantially the same amplitude as the first signal but having phase shifted by substantially 180° with respect to the first signal.

3. The system of claim 1, wherein the driver is capable of driving a first one of the cells with a first voltage signal that alternates between a low voltage pottion and a high voltage portion, and is capable of driving a second one of the cells with a second voltage signal having substantially the same amplitude as the first signal but having phase shifted by substantially 180° with respect to the first signal.

4. The system of claim 3, wherein each of the voltage portions is an AC voltage portion having frequency substantially equal to 2 KHz.

5. The system of claim 3, wherein the low voltage portion has peak to peak amplitude in the range from zero volts to ten volts, and the high AC voltage portion has peak to peak amplitude in the range from 40 volts to 80 volts, and the cells each have thickness in the range from 5 microns to 7 microns.

6. The system of claim 1, wherein the driver is capable of driving a first one of the cells with a first voltage signal and is capable of driving a second one of the cells with a second voltage signal, where the amplitudes of the first and second voltage signals decrease in absolute magnitude substantially simultaneously, and the time-averaged amplitudes of the first and the second voltage signals are substantially equal to zero.

7. The system of claim 6, wherein the first voltage signal and the second voltage signal are carrier-less signals.

8. The system of claim 6, wherein the first voltage signal and the second voltage signal are modulated AC carrier waves.

9. A stereoscopic video display system, including:
(a) a monitor for displaying a field sequential stereo image; and
(b) a push-pull liquid crystal modulator unit, including a pair of surface mode liquid crystal cells having orthogonal rub axes and a linear polarizer having an absorption axis bisecting the orthogonal rub axes, said modulator unit being positioned to receive light transmitted from the monitor, and being capable of transmitting alternately left-handed and right-handed ciruularly polarized images with a first frequency.

10. The system of claim 9, also including: a left-handed circular polarizer analyzer and a right-handed circular polarizer analyzer, each analyzer dimensioned to be positioned between the modulator unit and a different eye of an observer.

11. The system of claim 10, wherein the analyzers are mounted in an eyeglass frame dimensioned to be worn by the observer.

12. The system of claim 9, wherein the field-sequential image consists of left and right fields alternating at the first frequency, and wherein the modulator unit includes: means for driving the cells in synchronization with the fields of the field-sequential image so that each circularly polarized image corresponds with a different one of the left and right fields.

13. The system of claim 12, wherein each field includes at least two subfields each having a duration, and the driving means is capable of driving a first one of the cells with a first voltage signal, and is capable of driving a second one of the cells with a second voltage signal, where the absolute magnitude of the envelope of the first voltage signal and the absolute magnitude of the envelope of the second voltage signal decrease substantially simultaneously during each subfield.

14. The system of claim 12, wherein each field includes at least two subfields each having a duration, and the driving means is capable of driving a first one of the cells with a first carrier-less voltage signal, and is capable of driving a second one of the cells with a second carrier-less voltage signal, where the absolute magnitude of the first voltage signal and the absolute magnitude of the second voltage signal decrease substantially simultaneously during each subfield.

15. Stereoscopic video display apparatus, including:
(a) a monitor for displaying a field-sequential stereo image; and
(b) a shutter system, including a push-pull liquid crystal modulator including a pair of surface mode liquid crystal cells having orthogonal rub axes and a linear polarizer having an absorption axis bisecting the orthogonal rub axes, and capable of sequentially transmitting left-hand circularly polarized light comprising the image and right-hand circularly polarized light comprising the image.

16. The system of claim 15, wherein the field-sequential stereo image consists of fields, each field including at least two subfields, and each subfield having a duration, and the shutter system includes means for driving a first one of the cells with a first voltage signal, and means for driving a second one of the cells with a second voltage signal, where the absolute magnitude of the envelope of the first voltage signal and the absolute magnitude of the envelope of the second voltage signal decrease substantially simultaneously during each subfield.

17. The system of claim 15, wherein the field-sequential stereo image consists of fields, each field including at least two subfields, and each subfield having a duration, and wherein the shutter system includes means for driving a first one of the cells with a first carrier-less voltage signal, and means for driving a second one of the cells with a second carrier-less voltage signal, where the absolute magnitude of the first voltage signal and the absolute magnitude of the second voltage signal decrease substantially simultaneously during each subfield.

18. The apparatus of claim 15, wherein the modulator is positioned so as to transmit light incident from the monitor, and the shutter system includes:
(c) a left-handed circular polarizer analyzer through which light transmitted through the modulator may be viewed by a first eye of an observer; and
(d) a right-handed circular polarizer analyzer through which light transmitted through the modulator may be viewed by a second eye of the observer.

19. The apparatus of claim 18, wherein the modulator includes:
(e) a first surface mode liquid crystal cell and a second surface mode liquid crystal cell laminated together so that a first surface of the first cell is adjacent a first surface of the second cell, and so that the rub axes of the cells are orthogonally oriented; and
(f) a linear polarizer laminated with a second surface of the first cell so that the linear polarizer's axis bisects the orthogonal rub axes.

20. The apparatus of claim 19, also including:
(g) an eyeglass frame, in which the analyzers are mounted; and wherein each analyzer has a linear polarizer component mounted in the frame so that the linear polarizer component's absorption axis is oriented orthogonally relative to the absorption axis of the linear polarizer.

21. The apparatus of claim 19, wherein the shutter system includes a first driver coupled to the first cell and a second driver coupled to the second cell, each said driver being capable of driving the cell coupled thereto with a signal that alternates, with a first frequency between a low voltage signal portion and a high voltage signal portion.

22. The apparatus of claim 21, wherein the field-sequential stereo image consists of right and left fields having equal duration and alternating with said first frequency, and including: means for synchronizing each driver with the field-sequential image so that the duration of each said field coincides with the duration of one of the signal portions.

23. The apparatus of claim 19, wherein the shutter system includes a first driver coupled to the first cell and a second driver coupled to the second cell, each said driver being capable of driving the cell coupled thereto with a carrier-less signal, having time-averaged voltage substantially equal to zero, that alternates with a first frequency between a low voltage portion and a high voltage portion.

24. The apparatus of claim 23, wherein the field-sequential stereo image consists of right and left fields having equal duration and alternating with said first frequency, and iccluding: means for synchronizing each driver with the field-sequential image so that the duration of each said field coincides with the duration of one of the voltage portions.

25. A method of displaying a stereoscopic video image, including the steps of:
   displaying a field-sequential stereoscopic image whose fields alternate at a field rate;
   positioning a push-pull liquid crystal modulator that includes a pair of surface mode liquid crystal cells with orthogonal rub axes and a linear polarizer having an absorption axis bisecting the orthogonal rub axes, so that light comprising the image will propagate therethrough; and
   driving the modulator in synchronization with the fields of the image so that the transmitted image emerging from the modulator consists of right-handed circularly polarized fields alternating at the field rate with left-handed circularly polarized fields.

26. The method of claim 25, also including the step of:
positioning a left-handed circular polarizer analyzer and a right-handed circular polarizer analyzer so that circularly polarized light emerging from the modulator will propagate therethrough.

27. The method of claim 25, wherein the modulator includes a first surface mode liquid crystal cell and a second surface mode liquid crystal cell, and wherein the first cell is driven by a first voltage signal that alternates at field rate between a low voltage square wave and a high voltge square wave, and the second cell is driven by a second voltage signal having substantially the same amplitude as the first voltage signal but having phase opposite to the first signal's phase.

28. The method of claim 25, wherein each field includes at least two subfields, each subfield having a duration, the modulator includes a first surface mode liquid crystal cell and a second surface mode liquid crystal cell, and including the steps of: driving the first cell with a first voltage signal; and driving the second cell with a second voltage signal, in such a manner that the absolute magnitude of the envelope of the first voltage signal and the absolute magnitude of the envelope of the second voltage signal decrease substantially simultaneously during each subfield.

29. The system of claim 25, wherein each field includes at least two subfields, and each subfield having a duration, the modulator includes a first surface mode liquid crystal cell and a second surface mode liquid crystal cell, and including the steps of: driving the first cell with a first carrier-less voltage signal; and driving the second cell with a second carrier-less voltage signal, in such a manner that the absolute magnitude of the first voltage signal and the absolute magnitude of the second voltage signal decrease substantially simultaneously during each subfield.

30. The method of claim 25, wherein the modulator includes a first surface mode liquid crystal cell and a second surface mode liquid crystal cell, and wherein the first cell is driven by a first voltage signal that alternates at field rate between a low AC voltage portion and a high AC voltage portion, and the second cell is driven by a second voltage signal having substantially the same amplitude as the first voltage signal but having phase opposite to the first signal's phase.

31. The method of claim 30, wherein each of the AC voltage portions is a 2 KHz sinusoidal wave, the low AC voltage portion has peak to peak amplitude in the range from zero volts to ten volts, and the high AC voltage portion has peak to peak amplitude in the range from 40 volts to 80 volts.

* * * * *

UNITED STATES PATENT AND TRADEMARK OFFICE
CERTIFICATE OF CORRECTION

PATENT NO. : 4,792,850

DATED : December 20, 1988

INVENTOR(S): Lenny Lipton, Arthur Berman, Lawrence D. Meyer, James L. Fergason

It is certified that error appears in the above - identified patent and that said Letters Patent is hereby corrected as shown below:

On the title page, first inventor's name should read in all instances --Lenny Lipton-- instead of "Lenny Liptoh";

On the title page, assignee should read --StereoGraphics Corporation-- instead of "SteroGraphics Corporation";

On the title page, under References Cited in Other Publications, the second reference should read --"Three-Dimensional Projection with Circular Polarizers" by V. Walworth, et al.-- instead of ""Three-Dimensional Projection with Circular Polarizers:" by V. Walworth, et al.";

On the title page, in the Abstract, lines 7 and 8, delete "steroscopic" and substitute --stereoscopic--;

Column 2, line 6, delete "electrooptical" and substitute --electro-optical--;

Column 2, line 23, delete "suutter" and insert --shutter--;

Column 4, line 28, insert --)-- after the word --state--;

Column 4, line 45, delete "althoug" and substitute --although--;

Column 4, line 51, delete "pooblems" and substitute --problems--;

UNITED STATES PATENT AND TRADEMARK OFFICE
CERTIFICATE OF CORRECTION

PATENT NO. : 4,792,850
DATED : December 20, 1988
INVENTOR(S) : Lenny Lipton, Arthur Berman, Lawrence D. Meyer, James L. Fergason It is certified that error appears in the above-identified patent and that said Letters Patent is hereby corrected as shown below:

Column 4, line 40, delete "add" and substitute --and--;

Column 5, line 59, delete "sufface" and substitute --surface--;

Column 6, line 3, delete "with" and substitute --(with--;

Column 6, line 65, delete "iiquid" and substitute --liquid--;

Column 9, line 21, delete "eqaal" and substitute --equal--;

Column 9, line 58, delete "signal s" and substitute --signals--;

Column 10, line 39, delete "an" and substitute --and--;

Column 12, line 3, delete "retardation" and substitute --retardation of--;

Column 12, line 15, delete "188" and substitute --108--;

Column 12, line 42, delete "system" and substitute --system is--;

Column 13, line 3, delete "pottion" and substitute --portion--;

Column 13, line 43, delete "ciruularly" and substitute --circularly--;

UNITED STATES PATENT AND TRADEMARK OFFICE
CERTIFICATE OF CORRECTION

PATENT NO. : 4,792,850

DATED : December 20, 1988

INVENTOR(S): Lenny Lipton, Arthur Berman, Lawrence D. Meyer
James L. Fergason

It is certified that error appears in the above - identified patent and that said Letters Patent is hereby corrected as shown below:

Column 15, line 28, delete "iccluding" and substitute --including--;

Column 16, line 46, delete "peak to peak" and substitute --peak-to-peak--;

Column 16, line 48, delete "peak to peak" and substitute --peak-to-peak--.

Signed and Sealed this

Eighth Day of August, 1989

*Attest:*

DONALD J. QUIGG

*Attesting Officer*  *Commissioner of Patents and Trademarks*